United States Patent
Hong

(10) Patent No.: US 8,144,615 B2
(45) Date of Patent: Mar. 27, 2012

(54) RATE MATCHING DEVICE AND METHOD FOR CONTROLLING RATE MATCHING IN COMMUNICATIONS SYSTEM

(75) Inventor: Sung Jin Hong, Osan-si (KR)

(73) Assignee: Pantech Co., Ltd., Seoul (KR)

( * ) Notice: Subject to any disclaimer, the term of this patent is extended or adjusted under 35 U.S.C. 154(b) by 186 days.

(21) Appl. No.: 12/546,363

(22) Filed: Aug. 24, 2009

(65) Prior Publication Data

US 2010/0046390 A1    Feb. 25, 2010

(30) Foreign Application Priority Data

Aug. 25, 2008   (KR) ................. 10-2008-0082996

(51) Int. Cl.
  *H04L 12/26* (2006.01)
  *H04B 7/216* (2006.01)
(52) U.S. Cl. ........................ 370/252; 370/342
(58) Field of Classification Search .............. 370/332, 370/312, 335, 349, 230; 455/151.2
  See application file for complete search history.

(56) References Cited

U.S. PATENT DOCUMENTS

| | | | |
|---|---|---|---|
| 6,078,568 A * | 6/2000 | Wright et al. ................. | 370/312 |
| 6,310,872 B1 * | 10/2001 | Almgren et al. .............. | 370/349 |
| 6,473,442 B1 * | 10/2002 | Lundsjo et al. ............... | 370/329 |
| 6,510,137 B1 * | 1/2003 | Belaiche ....................... | 370/232 |
| 7,007,216 B2 | 2/2006 | Hong | |
| 7,072,630 B2 * | 7/2006 | Lott et al. ................... | 455/151.2 |
| 7,082,565 B1 | 7/2006 | Michel | |
| 7,260,366 B2 * | 8/2007 | Lee et al. ...................... | 455/102 |
| 7,280,609 B2 | 10/2007 | Dottling | |
| 7,293,217 B2 * | 11/2007 | Pietraski et al. ............... | 714/790 |
| 7,640,486 B2 * | 12/2009 | Dottling et al. ............... | 714/790 |
| 7,649,839 B2 * | 1/2010 | Dendy .......................... | 370/230 |
| 7,995,540 B2 * | 8/2011 | Belaiche ....................... | 370/335 |
| 2001/0046211 A1 * | 11/2001 | Maruwaka et al. ........... | 370/252 |
| 2004/0160922 A1 * | 8/2004 | Nanda et al. .................. | 370/335 |

(Continued)

FOREIGN PATENT DOCUMENTS

EP    1806864    7/2007

OTHER PUBLICATIONS

Asanaka et al, Rate Matching Device and Method Thereof, De-Rate Matching Device and Method, Jul. 31, 2007, U.S. Appl. No. 60/953,084, 1-43.*

(Continued)

*Primary Examiner* — Steven H Nguyen
(74) *Attorney, Agent, or Firm* — H.C. Park & Associates, PLC

(57) ABSTRACT

A method for controlling rate matching in a communications system includes calculating a rate matching parameter containing a basic variable for an input bit string, and evaluating an additional parameter reflecting a current channel status of the transport channel receiving the input bit string. The input bit string generated in the upper layer is mapped to a physical channel of a Physical Layer by performing bit repeating or bit puncturing. If the bit repeating is executed on the input bit string on the basis of the first basic variable, and a second basic variable is calculated using the first basic variable and the additional parameter. A communication device to control rate matching between a physical channel and a transport channel includes a parameter calculator, an additional parameter generator, and a rate matching executioner to execute bit repeating or bit puncturing.

15 Claims, 6 Drawing Sheets

U.S. PATENT DOCUMENTS

| | | |
|---|---|---|
| 2004/0181618 A1 | 9/2004 | Dottling |
| 2004/0187069 A1* | 9/2004 | Pietraski et al. .............. 714/786 |
| 2004/0202114 A1 | 10/2004 | Maruwaka |
| 2004/0213182 A1* | 10/2004 | Huh et al. ..................... 370/332 |
| 2005/0249163 A1 | 11/2005 | Kim |
| 2006/0003702 A1* | 1/2006 | Nibe et al. ................. 455/67.11 |
| 2006/0040645 A1* | 2/2006 | Grilli et al. ................. 455/412.1 |
| 2007/0140326 A1* | 6/2007 | Singh ............................ 375/225 |
| 2007/0189240 A1* | 8/2007 | Cho et al. ...................... 370/337 |
| 2010/0238786 A1* | 9/2010 | Asanaka ....................... 370/329 |

OTHER PUBLICATIONS

3GPP TS 25.212 V8.2.0 (May 2008); 3rd Generation Partnership Project; Technical Specification Group Radio Access Network; Multiplexing and channel coding (FDD) (Release 8).

* cited by examiner

RATE MATCHING DEVICE AND METHOD FOR CONTROLLING RATE MATCHING IN COMMUNICATIONS SYSTEM

CROSS-REFERENCE TO RELATED APPLICATION

This application claims priority from and the benefit of Korean Patent Application No. 10-2008-0082996, filed on Aug. 25, 2008, which is hereby incorporated by reference for all purposes as if fully set forth herein.

BACKGROUND OF THE INVENTION

1. Field of the Invention

The present disclosure relates to a rate matching device and a rate matching method, and particularly to a rate matching device and a method for applying a rate matching technique when a high speed data processing technique is applied in a communications system.

2. Discussion of the Background

The Universal Mobile Telecommunications Service (UMTS) system is a mobile communications system based on the Global System for Mobile communications (GSM) and the General Packet Radio Service (GPRS), and is a third-generation mobile communications system that uses code division multiple access (CDMA) technology.

This UMTS system employs a virtual connection concept of a packet switching method using a packet protocol such as the Internet Protocol (IP). Through the UMTS system, users of mobile phones or computers may receive more consistent services, and may be capable of transmitting packet-based texts, digital voice or video, and multimedia data at a speed of 2 Mbps or more.

The High-Speed Uplink Packet Access (HSUPA) technique of the 3GPP Physical Layer for the UMTS is designed to improve data transmission speed using the enhanced uplink dedicated channel (E-DCH). The uplink dedicated channel supports the Hybrid automatic retransmission request (HARQ) technique, which is designed to provide more stable high-speed data transmission.

The HARQ is a technique for retransmitting packets to correct a packet error when the error occurs in the initially transmitted data packets. This technique may be classified as the chase combining (CC) technique of retransmitting the packets having the same format as the initially transmitted format when an error occurs, or the incremental redundancy (IR) technique of retransmitting the packet having a format different from the initially transmitted format when an error occurs.

The HARQ technique supports base station-based scheduling and Transmission Time Interval (TTI) of 10 ms and 2 ms, and thus may control the Physical Layer with 2 ms intervals. Moreover, since the HARQ technique separately imposes a power weight on each enhanced dedicated physical control channel (EDPCCH) or supports a spreading factor (SF) with a channel bit rate of 1920 kbps, more data may be transmitted in shorter time.

Rate matching is used for matching a volume of data to be transmitted per TTI to the maximum transmission volume of actual physical channels. Upon executing the rate matching, an operational algorithm is used for puncturing or repeating the bits of a transport block on a transport channel (TrCH) in accordance with the bit size of a physical channel frame that is used as a transmission unit on the corresponding physical channel (PhCH).

FIG. 1 is a flowchart illustrating a conventional rate matching method. FIG. 2 is a graph for explaining the conventional rate matching method of FIG. 1.

The rate matching method includes a step S110 of determining rate matching parameters, a step S120 of determining a rate matching pattern using the rate matching parameters, and a step S130 of executing the rate matching.

In the step S110 of determining the rate matching parameters, bits $\Delta N_{i,j}$ to be punctured or repeated are calculated in accordance with the number of bits transportable to the physical channel. Then, other rate matching parameters are calculated from the bits $\Delta N_{i,j}$.

The rate matching parameters are defined according to a telecommunications standard, such as the 3GPP standard TS 25.212, and can include an initial value (e_ini), an increment (e_plus) and a fixed decrement (e_minus) of a variable e used in an algorithm for determining the rate matching pattern. The rate matching pattern indicates whether the bits are punctured or repeated using the rate matching parameter. Once the rate matching parameters are calculated, the rate matching pattern may be determined using an algorithm defined in the 3GPP standard TS 25.212.

FIG. 2 shows an example in which the fifth bit and the ninth bit are punctured from an input bit index by using the rate matching algorithm when e<0.

In the step S130 of executing the rate matching pattern, bit puncturing or bit repeating in accordance with the rate matching pattern is executed to generate a rate matching block.

Specifically, the conventional rate matching algorithm determines the rate matching pattern, and then determines the bit repeating in the rate matching block if $\Delta N_{i,j}>0$, and determines the bit puncturing in the rate matching block if $\Delta N_{i,j}<0$. This algorithm may cause faster or more frequent bit puncturing to be executed in the rate matching block by decreasing the initial value (e_ini) of the variable e by the fixed decrement (e_minus). Upon executing the bit puncturing, retransmission is then executed for avoiding and/or correcting data bits where an error occurs. Accordingly, more rate matching algorithms are consequently executed. Moreover, time consumed to execute mapping between the transport channels and the physical channels is increased, as the bit puncturing may be executed more frequently. On the contrary, when the bit repeating is executed, the rate matching algorithm for executing the bit repeating may be applied once.

SUMMARY OF THE INVENTION

Exemplary embodiments of the present invention provide a method for executing mapping between transport channels and physical channels in a data high-speed transmitting technique.

Exemplary embodiments of the present invention also provide a rate matching device and a rate matching method that may reduce the frequency of bit puncturing when a rate matching algorithm of transport channels is applied for mapping between the transport channels and physical channels.

Exemplary embodiments of the present invention also provide a rate matching device and a rate matching method that may reduce time consumed to execute mapping between transport channels and physical channels by changing an attenuation scheme during bit repeating of a rate matching block.

Additional aspects of the invention will be set forth in the description which follows, and in part will be apparent from the description, or may be learned by practice of the invention.

An exemplary embodiment of the present invention discloses a communication device to control rate matching between a physical channel and a transport channel. The device includes: a parameter calculator to read an input bit string generated in an upper layer through a transport channel, and to calculate a rate matching parameter comprising a first basic variable for the input bit string; an additional parameter generator to calculate an additional parameter reflecting a channel status of the transport channel, and to calculate a second basic variable using the first basic variable and the additional parameter; and a rate matching executioner to execute bit repeating or bit puncturing on the input bit string on the basis of the rate matching parameter and the second basic variable to map the input bit string generated in the upper layer to the physical channel of a Physical Layer.

An exemplary embodiment of the present invention discloses a method for controlling rate matching in a communications system. The method includes: reading an input bit string generated in an upper layer through a transport channel, calculating a rate matching parameter comprising a first basic variable for the input bit string; determining whether to execute bit repeating or bit puncturing on the input bit string in accordance with the calculation result of the rate matching parameter; calculating an additional parameter reflecting a channel status of the transport channel if the bit repeating is determined; and mapping the input bit string generated in the upper layer to a physical channel of a Physical Layer by executing bit repeating on the input bit string on the basis of the first basic variable, and calculating a second basic variable using the first basic variable and the additional parameter.

An exemplary embodiment of the present invention discloses a method for mapping data between a transport channel and a physical channel. The method includes: calculating a rate matching parameter for an input bit string read through the transport channel; analyzing a channel status of the transport channel; and executing bit repeating on the input bit string in accordance with the calculation result of the rate matching parameter and according to the channel status of the transport channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

Figure 1:
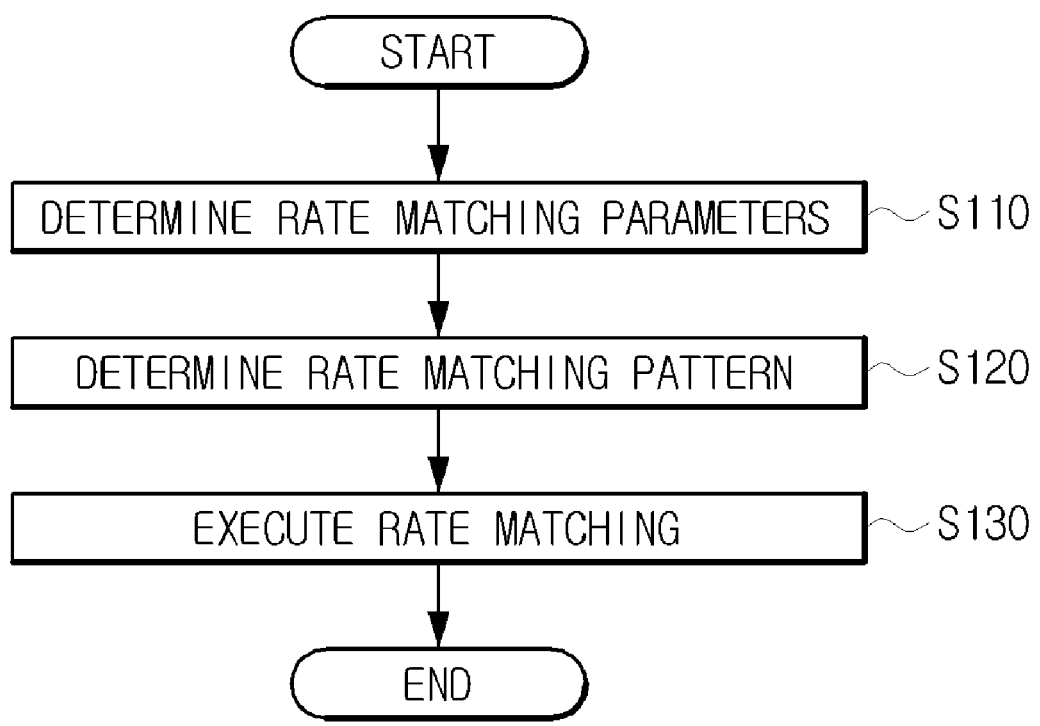
FIG. 1 is a flowchart illustrating a conventional rate matching method.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, a rate matching device according to an exemplary embodiment will be described in more detail with reference to the accompanying FIG. 3.

Figure 3:
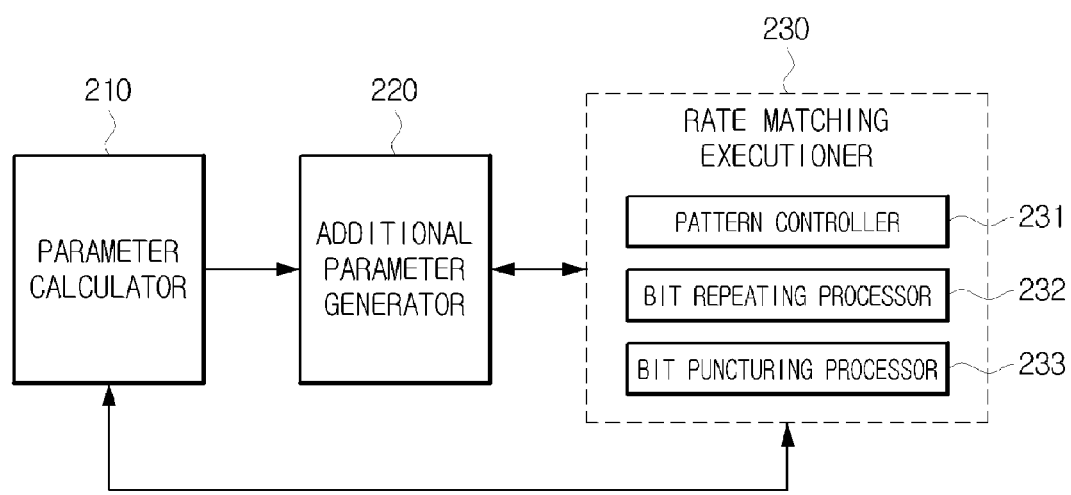
FIG. 3 is a diagram illustrating the configuration of a rate matching device according to an exemplary embodiment of the invention.

FIG. 3 is a diagram illustrating the configuration of the rate matching device according to an exemplary embodiment of the invention.

With reference to FIG. 3, the rate matching device includes a parameter calculator 210, an additional parameter generator 220, and a rate matching executioner 230.

The parameter calculator 210 reads an input bit string constituting transport format combination (TFC) from an upper layer through a transport channel and calculates a rate matching parameter for the input bit string. The upper layer for delivering the input bit string may be the Medium Access Control (MAC) layer.

The rate matching parameter includes $N_{data,j}$, $N_{i,j}$, $Z_{i,j}$, and $\Delta N_{i,j}$ defined in accordance with the 3GPP standard TS 25.212. The rate matching parameter also includes a basic variable such as an initial value (e_ini), an increment (e_plus), and a decrement (e_minus) of a variable e evaluated from $N_{data,j}$ and $\Delta N_{i,j}$. Representatively, $N_{data,j}$ denotes the total number of bits that are available for a Physical Layer in a radio frame with transport format combination j. $\Delta N_{i,j}$ denotes the number of bits to be punctured or repeated by rate matching in each radio frame on TrCH i with transport format combination j. $Z_{i,j}$ is a intermediate calculation variable, and denotes an intermediate parameter for evaluating $\Delta N_{i,j}$.

Bits on the TrCH may be repeated or punctured by the rate matching in accordance with the bit size of a physical channel frame that is used as a transmission unit on the corresponding physical channel (PhCH). The input bit string generated in the upper layer may be mapped to the physical channel (PhCH) of the Physical Layer during the bit repeating/puncturing on the TrCH. Upon executing the rate matching, the upper layer allots rate matching attributes such as Transmission Time Interval (TTI), spreading factor (SF), and coding scheme. The parameter calculator 210 receives these attributes to calculate the number of bits $\Delta N_{i,j}$ to be repeated or punctured. The number of bits $\Delta N_{i,j}$ may depend on the TTI.

The additional parameter generator 220 evaluates an additional parameter reflecting the current channel status of the transport channel and updates the basic variable calculated by the parameter calculator 210 using the additional parameter. A bit number variation $\Delta M_i$ indicating a variation in the number of bits to be subjected to the rate matching in an i-th transport channel and a variation rate weight α between temporarily stored $\Delta M_i$ and $\Delta M_{i+1}$ may be calculated by using the additional parameter. The bit number variation $\Delta M_i$ and the variation rate weight α may be respectively determined according to Equations 1 and 2.

$$\Delta M_i = |\Delta N_{i+1,j} - \Delta N_{i,j}|, \text{ where } \Delta N_{i,j} = Z_{i,j} - Z_{i-1,j} - N_{i,j} \quad \text{[Equation 1]}$$

$$\alpha = |\Delta M_i / \Delta M_{i+1}| \quad \text{[Equation 2]}$$

The rate matching executioner 230 generates a rate matching block mapped to the physical channel. The rate matching block is generated by executing the bit repeating or the bit puncturing on the input bit string on the basis of the rate matching parameter (representatively, $\Delta N_{i,j}$) calculated by the parameter calculator 210 and the basic variables (e_ini, e_minus, and e_plus) updated by the additional parameter generator 220.

The above-described rate matching executioner 230 includes a pattern controller 231, a bit repeating processor 232, and a bit puncturing processor 233.

The pattern controller 231 determines whether to execute the bit repeating or the bit puncturing on the input bit string in accordance with the rate matching parameter (representatively, $\Delta N_{i,j}$) calculated by the parameter calculator 210. For example, the pattern controller 231 determines the bit repeating if the number of bits $\Delta N_{i,j}$ to be subjected to the rate matching in an i-th transport channel $TrCH_i$ receiving a j-th transport format combination $TFC_j$ satisfies the relation $\Delta N_{i,j} > 0$. Conversely, if the relation $\Delta N_{i,j} < 0$ is satisfied, the bit puncturing is determined. If $\Delta N_{i,j} = 0$, the rate matching is not separately executed since the TrCH and the PhCH have already been mapped to each other.

If the bit repeating is determined by the pattern controller 231, the bit repeating processor 232 performs the bit repeating in the rate matching block a number of times on the basis of the basic variable updated by the additional parameter generator 220, while updating the additional parameter and the basic variable along with the additional parameter generator 220. If the bit puncturing is determined by the pattern controller 231, the bit puncturing processor 233 executes the bit puncturing in the rate matching block.

As a consequence, bits are repeated or punctured to allow the total bit ratio obtained after TrCH multiplexing to be equal to the total channel bit ratio of the dedicated PhCH allocated. The number of times the bit repeating/puncturing is executed is controlled in accordance with the status of the TrCH, and may reduce the frequency of bit puncturing among the bit puncturing/repeating.

Hereinafter, the rate matching method according to an exemplary embodiment will be described in more detail with reference to the accompanying FIG. 4, FIG. 5, and FIG. 6.

Figure 4:
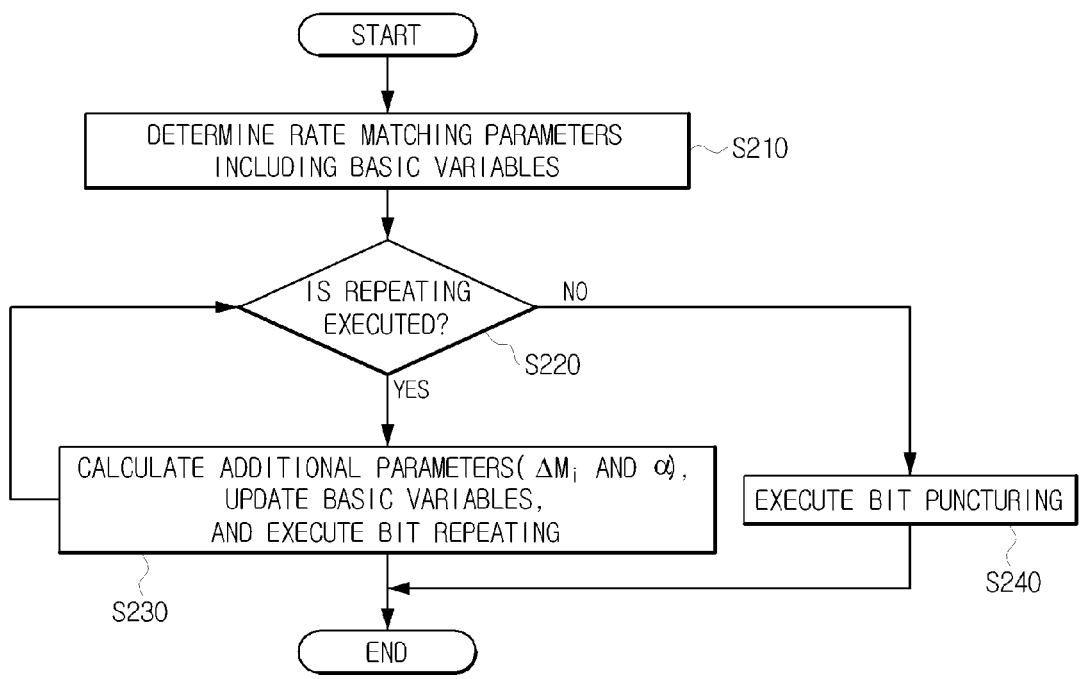
FIG. 4 is flowchart illustrating a rate matching method according to an exemplary embodiment of the invention.

FIG. 4 is flowchart illustrating the rate matching method according to an exemplary embodiment of the invention.

The rate matching device punctures or repeats the bits of a transport format combination in accordance with the bit size of a physical channel frame. The transport format combination (TFC) is a transport unit on the transport channel, and the physical channel frame (radio frame) is a transport unit on the corresponding physical channel.

In order to execute this process, the rate matching device first reads an input bit string constituting the TFC and calculates rate matching parameters ($N_{data,j}$, $Z_{i,j}$, $\Delta N_{i,j}$, etc.) including the basic variables (e_ini, e_plus, and e_minus) for the input bit string (S210). Subsequently, it is determined whether to execute the bit repeating or the bit puncturing on the input bit string depending on the calculation result of the rate matching parameters (S220).

Here, the rate matching device first calculates the number of bits $\Delta N_{i,j}$ to be punctured or repeated in accordance with the number of bits transportable to the physical channel and calculates the rate matching parameters (including the basic variables) for generating the rate matching block using the number of bits $\Delta N_{i,j}$. The rate matching device may be located in a base station or in a user terminal and determines the rate matching parameters using the same input information. The rate matching parameters may be defined in accordance with the 3GPP standard TS 25.212. In particular, the basic variable is evaluated from the total number of bits $N_{data,j}$ that are available for the Physical Layer and the number of bits $\Delta N_{i,j}$ to be punctured or repeated by the rate matching. The basic variable includes the initial value (e_ini), the increment (e_plus), and the decrement (e_minus) of the variable e.

Various rate matching methods used in conjunction with various operational modes are defined in 4.2.7 of the 3GPP standard 25.212.

The rate matching on an uplink is defined in a manner different from that of the rate matching on a downlink. In addition, in the downlink, the rate matching parameter for the fixed location of the transport channel is calculated in a manner different from that of a parameter for moving location of the transport channel. Even in the same location, the rate matching parameter for a convolutionally encoded transport channel is calculated in a manner different from that of a parameter for a turbo-encoded transport channel during channel encoding before the rate matching. The rate matching parameter may be calculated in accordance with the 3GPP standard 25.212.

To describe main processes, the rate matching device calculates the spreading factor SF to be used in a user terminal and a code number $N_{data,j}$ of the physical channel. That is, if an index of the TFC representing the transport channel format, including the size of the transport block, in every TrCH is j, $N_{data,j}$ is determined as the number of bits (the bit size of the physical channel) available for the Physical Layer.

If bit puncturing is to be performed, the bit size $N_{data,j}$ on the physical channel is determined to reduce the number of bits to be punctured within a predetermined puncturing limit (PL) and to reduce multi-code transmission. Here, PL denotes a predetermined ratio value for permitting the puncturing to reduce the multi-code transmission and have a higher SF.

When $N_{data,j}$ is determined, the SF and the number of codes of the PhCH to be used in a user terminal are determined by $N_{data,j}$. Other detailed matters for determining $N_{data,j}$ may be determined in accordance with 4.2.7.1.1 of the 3GPP standard 25.212.

When $N_{data,j}$ is determined, the number of bits $\Delta N_{i,j}$ to be punctured or repeated by the rate matching may be determined. The number of bits $\Delta N_{i,j}$ to be punctured or repeated by the rate matching may be determined by Equation 3 described in 4.2.7 of the 3GPP standard 25.212.

$$\Delta N_{i,j} = Z_{i,j} - Z_{i-1,j} - N_{i,j}, \quad \text{[Equation 3]}$$

for all $i = 1, \ldots 1$ $$Z_{0,j} = 0$$

$$Z_{i,j} = \left\lfloor \frac{\left(\sum_{m=1}^{i}(RM_m \times N_{m,j})\right) \times N_{data,j}}{\sum_{m=1}^{i}(RM_m \times N_{m,j})} \right\rfloor,$$

for $i = 1, \ldots 1$

In Equation 3, $Z_{0,j}$ and $Z_{i,j}$ are parameters defined by Equation 3 and $\lfloor \; \rfloor$ denotes the maximum integer which does not exceed the value therein. Here, $\Delta N_{i,j}$ denotes a number of bits to be punctured or repeated in each frame of $TrCH_i$, which is an i-th transport channel having $TFC_j$. A positive value of $\Delta N_{i,j}$ means that the bits are to be repeated, whereas a negative value of $\Delta N_{i,j}$ means that the bits are to be punctured. $N_{m,j}$ denotes the number of bits before the rate matching of an m-th transport channel $TrCH_m$ having $TFC_j$, which is the number of bits encoded in $TrCH_m$.

In this way, when the rate matching parameters including the basic variables (e_ini, e_minus, and e_plus) are calculated (S210), it is determined whether to execute the bit repeating or the bit puncturing in the input bit string in accordance with the calculation result of the rate matching parameters (representatively, $\Delta N_{i,j}$) (S220). Then, the bit repeating/puncturing is executed in accordance with the result and the rate matching block to be mapped to the PhCH is generated (S230 and S240).

When the number of bits encoded on a specific transport channel is smaller than the number of bits allocated and rate-matched for the transport channel, the bit repeating is executed (S230). Otherwise, when the number of bits encoded on a specific transport channel is larger than the number of bits allocated and rate-matched for the transport channel, the bit puncturing is executed (S240).

In this way, the rate matching device generates the rate matching block for executing the mapping between the TrCH and the PhCH by puncturing or repeating the bits of the corresponding location on the basis of the value of $\Delta N_{i,j}$. Thus, the rate matching device may detect or avoid error bits, while repeatedly executing the bit puncturing and the bit repeating. However, the bit puncturing may be limited at a ratio of (1−PL)*100 shared between the base station and the user terminal to reduce the risk of excessive puncturing and an increase in the number of times of retransmission caused by the puncturing.

Moreover, the rate matching device may execute the bit repeating more times before the bit puncturing by applying an additional parameter that reflects the current transport channel status during the bit repeating (S230). The reason is to reduce the retransmission and the bit puncturing from creating a load increase due to the retransmission.

Specifically, to confirm whether the bit repeating is performed, the rate matching device determines whether $\Delta N_{i,j} > 0$ (S220). Subsequently, if the relation $\Delta N_{i,j} > 0$ is satisfied and the bit repeating is determined, the rate matching device evaluates the additional parameter reflecting the current transport channel status and repeats the bit repeating in the rate matching block on the basis of the basic variables updated, while updating the basic variables using the additional parameters (S230).

As the additional parameters, the bit number variation $\Delta M_i$ indicating the variation in the number of bits to be subjected to the rate matching in the i-th transport channel and the variation rate weight $\alpha$ between the temporarily stored $\Delta M_i$ and $\Delta M_{i+1}$ may be applied. Here, the bit number variation $\Delta M_i$ and the variation rate weight $\alpha$ are values for adjusting the number of bits repeating in the input bit string in accordance with the channel status of the transport channel by changing the decrement (e_minus) and increasing the number of bits repeating The bit number variation $\Delta M_i$ and the variation rate weight $\alpha$ are determined according to the equations, '$\Delta M_i = |\Delta N_{i+1,j} - \Delta N_{i,j}|$, where $\Delta N_{i,j} = Z_{i,j} - Z_{i-1,j} - N_{i,j}$' and '$\alpha = |\Delta M_i / \Delta M_{i+1}|$', respectively. To change the decrement (e_minus) by applying the additional parameter, the value of the variable e may be a value equal to or larger than a predetermined limit RL (Repeat Limitation). If the value of the variable e is a value equal to or smaller than the predetermined limit RL, the bit repeating is executed until the relation $\Delta N_{i,j} < 0$ is satisfied by applying the decrement (e_minus) fixed when the value of $\Delta M_i$ is calculated, and then the bit puncturing is executed for the corresponding bits. When the relation $\Delta N_{i,j} < 0$ is satisfied and the bit repeating ends, the bit puncturing is executed in the rate matching block (S240). If $\Delta N_{i,j} = 0$, the rate matching is not executed.

Figure 5:
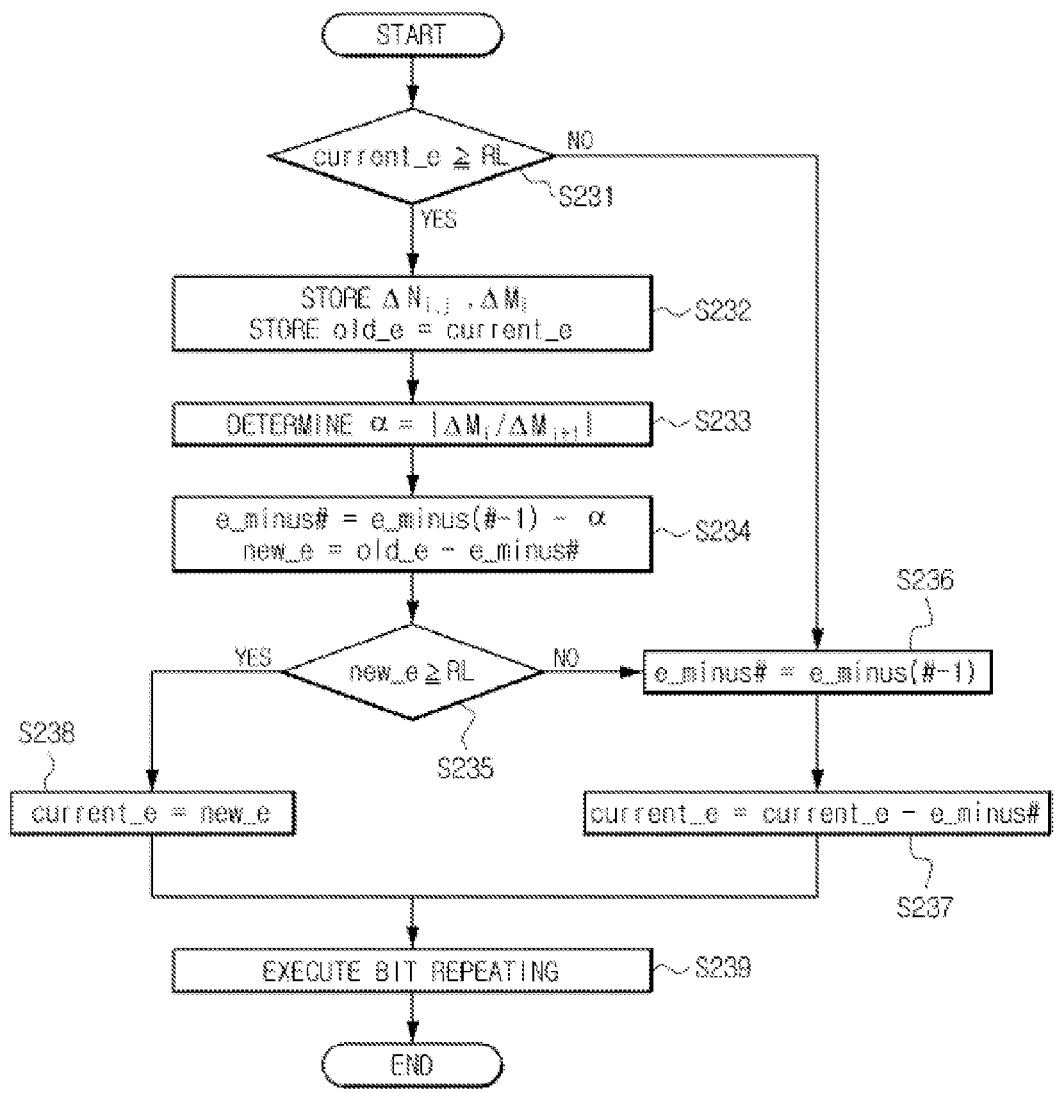
FIG. 5 is a flowchart illustrating a subdivided bit repeating of FIG. 4.
Figure 6:
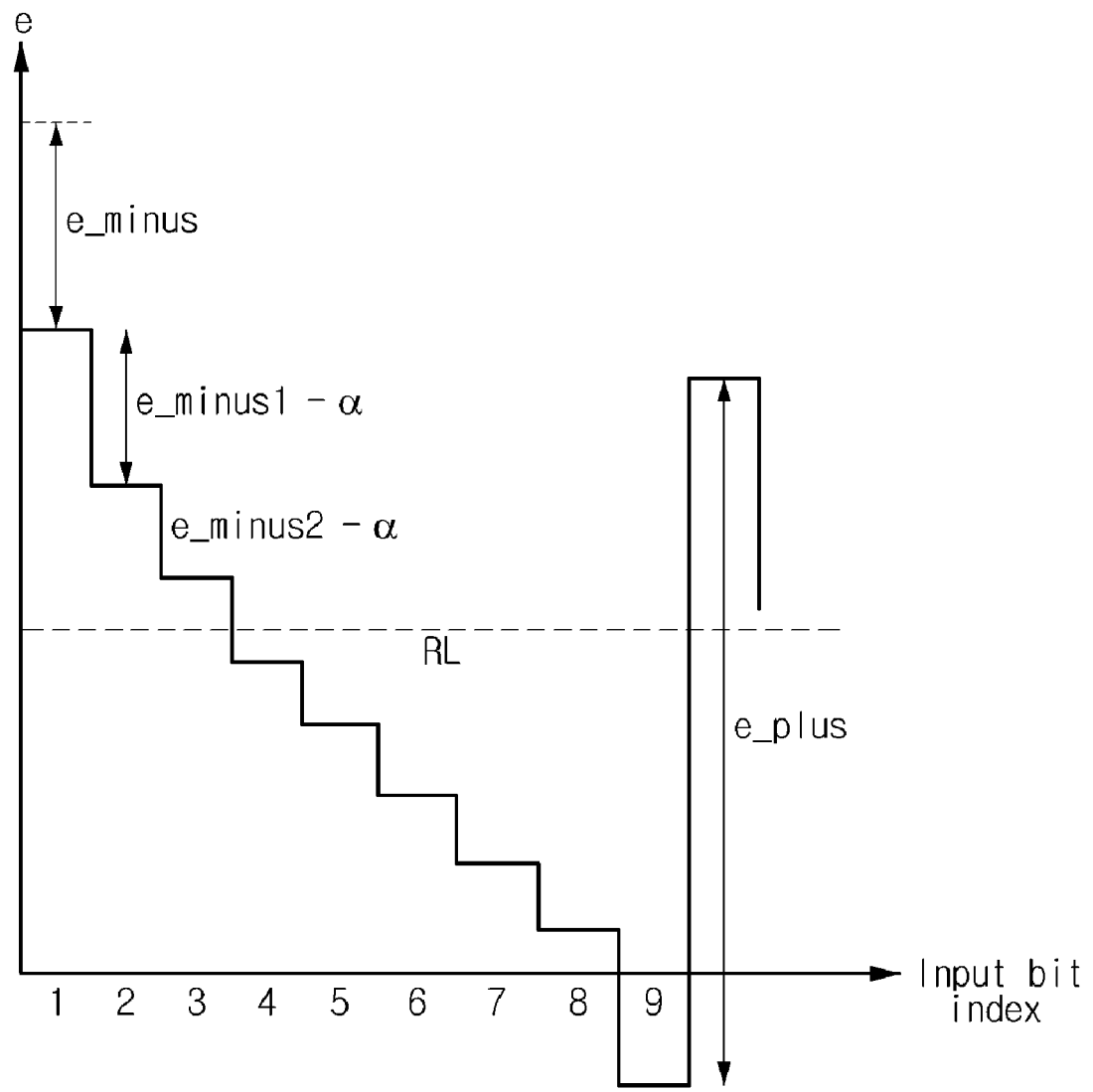
FIG. 6 is a graph for explaining the bit repeating of FIG. 5.

FIG. 5 is a flowchart illustrating a subdivided bit repeating of FIG. 4. FIG. 6 is a graph for explaining the bit repeating of FIG. 5 in comparison to FIG. 2.

If $\Delta N_{i,j} > 0$, the bit repeating is to be performed. If the rate matching device decreases the variable e by the fixed decrement (e_minus) from the initial value (e_ini), bit puncturing may be executed more frequently. As described above, in the bit puncturing, the rate matching device searches for the problematic bits to execute the retransmission. For the retransmission, more rate matching algorithms are applied. Therefore, if bit puncturing is executed more frequently, time consumed to execute the mapping between the transport channels and the physical channels may increase. To reduce this problem, a method for modifying an attenuation scheme fixed during the bit repeating of the rate matching block may be used, as shown in FIG. 6.

First, current_e is defined as e_ini, and e_minus# is defined as e_minus, where # may be set as 1, and increases according to input bit index.

The rate matching device confirms whether the current value (current_e) of the variable e is a value equal to or larger than the limit RL of the decrement, which value may be predetermined to reduce the risk of excessive bit repeating (S231). If not, then a next e_minus# is set as equal to the previous e_minus(#−1) (S236). For example, for an input bit index of 2, if current_e is less than limit RL, then e_minus2 is set equal to e_minus1 in S236. Then, new current value current_e is set equal to the previous current value current_e minus the decrement e_minus# (S237) and bit repeating is executed (S239).

If, however, the current value (current_e) of the variable e is equal to or larger than the limit RL of the decrement in S231, the number of bits $\Delta N_{i,j}$ and the bit number variation $\Delta M_i$ for bits which are the rate matching targets are stored, and the current value (current_e) of the variable e is stored, thus replacing the previous value (old_e) of the variable e (S232).

Then, the rate matching device evaluates the variation rate weight α between the bit number variation $\Delta M_i$ of the i-th transport channel and the bit number variation ($\Delta M_{i+1}$) of the (i+1)-th transport channel (S233).

Then, a next decrement e_minus# is set as equal to the previous decrement e_minus(#−1) minus α, and new_e is set equal to old_e_minus e_minus# (S234). For example, for an input bit index of 2, if current_e is greater than or equal to limit RL, then e_minus2 is set equal to e_minus1−α in S234. Then, new_e is determined as old_e, which was stored as current_e in S232, minus e_minus2. Thus, as shown in FIG. 6, a second decrement, e_minus2, equals e_minus1−α. As also shown in FIG. 6, the first decrement, e_minus1, equals e_minus since e_minus is set equal to e_minus1 for an input bit index 1 as explained above.

Then, the rate matching device confirms whether the new value (new_e) of the variable e is equal to or larger than the limit RL of the decrement (S235). If the new value (new_e) of the variable e is equal to or larger than the limit RL of the decrement, the new value (new_e) of the variable e is registered as the current value (current_e) of the variable e (S238) and bit repeating is executed (S239).

Otherwise, if the current value (current_e) of the variable e in S231 is smaller than the limit RL of the decrement or if the new value (new_e) of the variable e in S235 is smaller than the limit RL of the decrement, then a next decrement e_minus# is set as equal to the previous decrement e_minus(#−1) (S236). Then, a new current value current_e is obtained by subtracting the decrement (e_minus#) from the previous current value (current_e) of the variable e (S237).

In this way, if $\Delta N_{i,j} > 0$, the rate matching device executes the bit repeating and also determines whether the result of the variable e exceeds a predetermined critical value, that is, the limit RL (S231). If the variable e does not exceed the limit RL, the decrement (e_minus#) is not reduced by α and instead is set equal to the previous decrement (e_minus(#−1)), and the current value (current_e) of the variable e is decreased by the decrement (e_minus#) (S237) and normal bit repeating is executed (S239).

However, if the variable e exceeds the limit RL, the rate matching device evaluates the additional parameter using Equations 1 and 2 (S232 and S233). The basic variables are updated using this result (S234 and S238).

Here, the bit number variation $\Delta M_i$ means a variation in the number of bits to be punctured or repeated in each frame of the i-th transport channel TrCHi having $TFC_j$. The variation rate weight α means a variation rate of the temporarily stored bit number variation $\Delta M_i$ and the current bit number variation $\Delta M_{i+1}$. The limit RL of the decrement is a critical value determined to reduce the excessive bit repeating. The variable e is the corresponding bit error. The new_e is a newly calculated variable e and the old_e is a variable e temporarily stored in a backup buffer. The e_minus# is a changed value of the e_minus and # is an identifier for identifying a new value (new) or an old value (old) of e_minus.

The $\Delta M_i$ and α in Equations 1 and 2 are criteria for estimating the status of the current transport channel. The generation of the error bit may be increased or decreased depending on a change in the status. During the update process (S234 and S238) of the basic variables, the new_e reflecting the status of the current transport channel is calculated and a new e_minus# is also calculated during the corresponding process. In order to apply a weight for this, α is given and α functions as increasing the weight in every bit.

Figure 2:
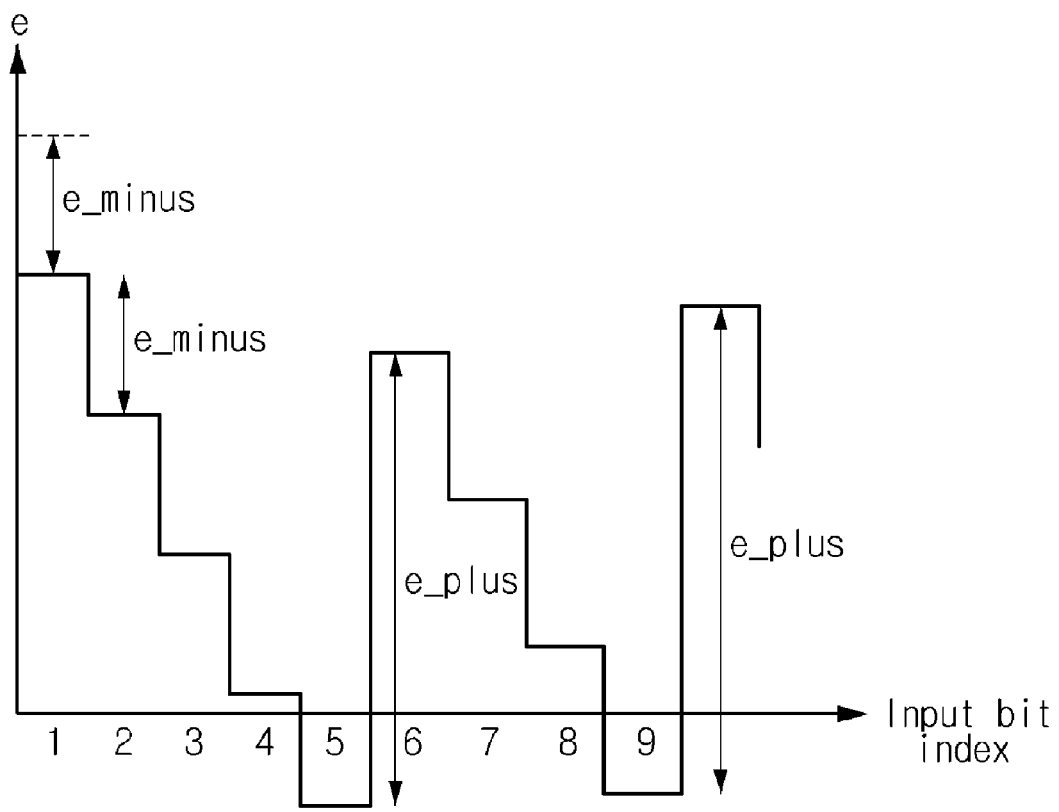
FIG. 2 is a graph for explaining the conventional rate matching method of FIG. 1.

According to the conventional technique described according to FIG. 2, the value of the variable e is decreased uniformly by the fixed decrement (e_minus) during the bit repeating and thus the number of bits repeating is limited, as shown in FIG. 2. On the contrary, the rate matching device according to this exemplary embodiment of the disclosure may execute bit repeating more frequently, and bit puncturing may occur less frequently by changing the fixed decrement (e_minus), as shown in FIG. 6. Moreover, in this exemplary embodiment, the error bit (for example, the ninth bit) is removed by the bit puncturing, and then the rate matching algorithm is again applied to determine and apply a new rate matching pattern. During this process, the bits subjected to the bit puncturing may be reduced even though the number of physical channels is not varied.

That is, the rate matching device calculates an appropriate value of e_minus# by estimating the status of the current transport channel through $\Delta M_i$ and α, repeatedly executes the bit repeating of the rate matching in accordance with the calculation result, and may reduce the occurrence of bit puncturing. In this case, the value of the variable e is equal to or larger than the limit RL of the predetermined decrement. Once this value of the variable e is smaller than the limit RL, the bit repeating is executed until the relation $\Delta N_{i,j} < 0$ is satisfied by applying the decrement (e_minus) fixed when the value of $\Delta M_i$ is calculated. If $\Delta N_{i,j} = 0$, the rate matching is not executed.

By reduced the frequency of the bit puncturing pattern by controlling the rate matching algorithm of the transport channels and repeatedly reprocessing the error bits through the bit repeating pattern, it is possible to improve mapping efficiency between the transport channels and the physical channels.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A communication device to control rate matching between a physical channel and a transport channel, comprising:

a parameter calculator to read an input bit string generated in an upper layer through a transport channel, and to calculate a rate matching parameter comprising a first basic variable for the input bit string;

an additional parameter generator to calculate an additional parameter reflecting a channel status of the transport channel, and to calculate a second basic variable using the first basic variable and the additional parameter; and a rate matching executioner to execute bit repeating or bit puncturing on the input bit string on the basis of the rate matching parameter and the second basic variable to map the input bit string generated in the upper layer to the physical channel of a Physical Layer, wherein the additional parameter comprises at least one of a bit number variation $\Delta M_i$ indicating a variation in a number of bits to be subjected to the rate matching in an i-th transport channel, and a variation rate weight α between temporarily stored $\Delta M_i$ and a bit number variation $\Delta M_{i+1}$ of an (i+1)-th transport channel.

2. The communication device of claim 1, wherein the rate matching executioner comprises:

a pattern controller to determine whether to execute the bit repeating or the bit puncturing on the input bit string in accordance with the rate matching parameter;

a bit repeating processor to execute the bit repeating on the input bit string on the basis of the second basic variable, and to update the additional parameter and the second basic variable along with the additional parameter generator; and a bit puncturing processor to execute the bit puncturing on the input bit string.

3. The communication device of claim 1, wherein the first basic variable is defined in accordance with a telecommunications standard, is evaluated from a total number of bits $N_{data,j}$ available for the Physical Layer and a number of bits $\Delta N_{i,j}$ to be punctured or repeated by the rate matching, and comprises an initial value (e_ini), an increment (e_plus), and a decrement (e_minus) of a variable e.

4. The communication device of claim 1,
wherein the bit number variation $\Delta M_i$ satisfies the relation '$\Delta M_i = |\Delta N_{i+1,j} - \Delta N_{i,j}|$',
where $\Delta N_{i,j}$ is a number of bits to be punctured or repeated by the rate matching and is determined as '$\Delta N_{i,j} = Z_{i,j} - Z_{i-1,j} - N_{i,j}$',
the variation rate weight $\alpha$ satisfies '$\alpha = |\Delta M_i / \Delta M_{i+1}|$', and $Z_{i,j}$ and $Z_{i-1,j}$ are intermediate parameters.

5. A method for controlling rate matching in a communications system, comprising:
reading an input bit string generated in an upper layer through a transport channel;
calculating a rate matching parameter comprising a first basic variable for the input bit string;
determining whether to execute bit repeating or bit puncturing on the input bit string in accordance with the calculation result of the rate matching parameter;
calculating an additional parameter reflecting a channel status of the transport channel if the bit repeating is determined; and
mapping the input bit string generated in the upper layer to a physical channel of a Physical Layer by executing bit repeating on the input bit string on the basis of the first basic variable, and calculating a second basic variable using the first basic variable and the additional parameter,
wherein the additional parameter comprises at least one of a bit number variation $\Delta M_i$ indicating a variation in a number of bits to be subjected to the rate matching in an i-th transport channel, and a variation rate weight $\alpha$ between temporarily stored $\Delta M_i$ and a bit number variation $\Delta M_{i+1}$ of an (i+1)-th transport channel.

6. The method of claim 5, wherein the first basic variable is defined in accordance with a telecommunications standard, is evaluated from a total number of bits $N_{data,j}$ available for the Physical Layer and a number of bits $\Delta N_{i,j}$ to be punctured or repeated by the rate matching, and comprises an initial value (e_ini), an increment (e_plus), and a decrement (e_minus) of a variable e.

7. The method of claim 5,
wherein the bit number variation $\Delta M_i$ satisfies the relation '$\Delta M_i = |\Delta N_{i+1,j} - \Delta N_{i,j}|$',
where $\Delta N_{i,j}$ is a number of bits to be punctured or repeated by the rate matching and is determined as '$\Delta N_{i,j} = Z_{i,j} - Z_{i-1,j} - N_{i,j}$',
the variation rate weight $\alpha$ satisfies '$\alpha = |\Delta M_i / \Delta M_{i+1}|$', and $Z_{i,j}$ and $Z_{i-1,j}$ are intermediate parameters.

8. The method of claim 7, wherein the variation rate weight $\alpha$ is a value equal to or smaller than a predetermined limit of a decrement.

9. The method of claim 7, wherein the bit number variation $\Delta M_i$ and the variation rate weight $\alpha$ are values for adjusting the number of bits repeating in the input bit string in accordance with the status of the transport channel by changing a decrement (e_minus) of a variable e and increasing the number of bits repeating.

10. The method of claim 6, wherein mapping the input bit string comprises:
confirming whether a current value (current_e) of the variable e is equal to or larger than a predetermined decrement limit;
storing a number of bits $\Delta N_{i,j}$ and a bit number variation $\Delta M_i$ if the current value (current_e) of the variable e is equal to or larger than the predetermined decrement limit, and storing the current value (current_e) of the variable e as a previous value (old_e) of the variable e;
determining a variation rate weight $\alpha$ as a ratio of a bit number variation $\Delta M_i$ of an i-th transport channel and a bit number variation $\Delta M_{i+1}$ of an (i+1)-th transport channel;
setting a new decrement (e_minus#) of the variable e in accordance with the relation 'e_minus# = e_minus(#−1)−$\alpha$' and registering a new value (new_e) of the variable e as the previous value (old_e) minus the new decrement (e_minus#) of the variable e;
confirming whether the new value (new_e) of the variable e is equal to or larger than the predetermined decrement limit;
registering the new value (new_e) of the variable e as the current value (current_e) of the variable e if the new value (new_e) of the variable e is equal to or larger than the predetermined decrement limit; and
setting the new decrement (e_minus#) equal to an old decrement (e_minus(#−1)), and determining a next current value of the variable e by subtracting the new decrement (e_minus#) from the current value (current_e) of the variable e, if the current value (current_e) of the variable e is smaller than the predetermined decrement limit or the new value (new_e) of the variable e is smaller than the predetermined decrement limit.

11. A method for mapping data between a transport channel and a physical channel, comprising:
calculating a rate matching parameter for an input bit string read through the transport channel;
analyzing a channel status of the transport channel; and
executing bit repeating on the input bit string in accordance with the calculation result of the rate matching parameter and according to the channel status of the transport channel,
wherein the channel status of the transport channel is analyzed using an additional parameter, and
wherein the additional parameter comprises at least one of a bit number variation $\Delta M_i$ indicating a variation in the number of bits to be subjected to the rate matching in an i-th transport channel, and a variation rate weight $\alpha$ between temporarily stored $\Delta M_i$ and a bit number variation $\Delta M_{i+1}$ of an (i+1)-th transport channel.

12. The method of claim 11, wherein the rate matching parameter is defined in accordance with a telecommunications standard, is evaluated from a total number of bits $N_{data,j}$ available for a Physical Layer and a number of bits $\Delta N_{i,j}$ to be punctured or repeated by rate matching, and comprises an initial value (e_ini), an increment (e_plus), and a decrement (e_minus) of a variable e.

13. The method of claim 11,
wherein the bit number variation $\Delta M_i$ satisfies the relation '$\Delta M_i = |\Delta N_{i+1,j} - \Delta N_{i,j}|$', where $\Delta N_{i,j}$ is a number of bits to be punctured or repeated by the rate matching and is determined as '$\Delta N_{i,j} = Z_{i,j} - Z_{i-1,j} - N_{i,j}$', the variation rate weight $\alpha$ satisfies '$\alpha = |\Delta M_i / \Delta M_{i+1}|$', and $Z_{i,j}$ and $Z_{i-1,j}$ are intermediate parameters.

14. The method of claim 13, wherein the variation rate weight $\alpha$ is a value equal to or smaller than a predetermined decrement limit.

15. The method of claim 13, wherein the bit number variation $\Delta M_i$ and the variation rate weight $\alpha$ are values for adjusting the number of bits repeating in the input bit string in accordance with the status of the transport channel by changing a decrement (e_minus) of a variable e and increasing the number of bits repeating.

* * * * *